United States Patent
Carlock

(10) Patent No.: US 10,178,038 B1
(45) Date of Patent: Jan. 8, 2019

(54) SYSTEM AND COMPUTER-IMPLEMENTED METHOD FOR DYNAMICALLY CHANGING NETWORK PORT SPEED OF FIBER CHANNEL INITIATOR

(71) Applicant: STATE FARM MUTUAL AUTOMOBILE INSURANCE COMPANY, Bloomington, IL (US)

(72) Inventor: Brent Carlock, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 51 days.

(21) Appl. No.: 15/599,188

(22) Filed: May 18, 2017

(51) Int. Cl.
- *H04L 12/24* (2006.01)
- *H04L 12/26* (2006.01)
- *H04L 29/08* (2006.01)
- *H04L 12/835* (2013.01)
- *H04L 12/931* (2013.01)

(52) U.S. Cl.
CPC .......... *H04L 47/30* (2013.01); *H04L 41/0816* (2013.01); *H04L 43/062* (2013.01); *H04L 43/0894* (2013.01); *H04L 49/357* (2013.01); *H04L 67/1097* (2013.01); *H04L 67/2842* (2013.01)

(58) Field of Classification Search
CPC ........ H04L 47/11; H04L 47/115; H04L 47/26; H04L 47/33; H04L 47/35; H04W 28/0215; H04W 28/0221; H04W 28/0226; H04W 28/0231; H04W 28/0236; H04W 28/0242; H04W 28/0278
See application file for complete search history.

(56) References Cited

U.S. PATENT DOCUMENTS

| | | | | |
|---|---|---|---|---|
| 4,599,722 A | * | 7/1986 | Mortimer | H03M 13/033 714/759 |
| 7,327,692 B2 | * | 2/2008 | Ain | H04L 25/4908 370/252 |
| 7,346,026 B2 | * | 3/2008 | Sherman | H04L 1/0083 370/328 |
| 7,454,219 B2 | * | 11/2008 | Mege | H04W 56/0005 455/502 |
| 9,113,485 B2 | * | 8/2015 | Chintalapudi | H04W 74/0841 |

* cited by examiner

*Primary Examiner* — Sharad Rampuria
(74) *Attorney, Agent, or Firm* — Hovey Williams LLP

(57) ABSTRACT

A system and method for improving the functioning of a data storage array by allowing for dynamically changing a speed of a communications port receiving data from a server via a fiber channel network managed by a network switch. The switch is queried to determine which server is sending data to each port, and to determine the speed and flow rate of the data through each port. The port experiencing the highest speed of data is identified, and if the cache write pending is above a threshold or if the array is otherwise unable to save the data at the speed at which it is being received, then the switch is set to limit the speed through that port, thereby avoiding a backup of data which could cause the port to be taken offline. A record of the change and an alert that the change was made are then generated.

19 Claims, 2 Drawing Sheets

SYSTEM AND COMPUTER-IMPLEMENTED METHOD FOR DYNAMICALLY CHANGING NETWORK PORT SPEED OF FIBER CHANNEL INITIATOR

FIELD OF THE DISCLOSURE

The present disclosure generally relates to systems and methods for improving the functioning of storage arrays of electronic memories, and more particularly, to a system and computer-implemented method for dynamically changing a network port speed of a server or other fiber channel initiator communicating data to a storage array.

BACKGROUND

Enterprise class storage arrays include multiple data storage pools for storing data. Each pool has finite capacity and performance capabilities. A "cache write pending" condition occurs when a storage pool is not adequately sized for a given workload and the data received in the storage controller's cache is not able to de-stage quickly enough to the undersized storage pool media. A Server Priority Manager controls how fast a server can communicate with the storage array by inserting commands into the fiber channel conversation. For example, the Server Priority Manager may insert a small computer system interface (SCSI) "wait" statement to slow down a conversation, though doing so results in a large amount of latency in the conversation. For more extreme cases, storage arrays include a self-protect function that sends an offline sequence to multiple storage area network (SAN) fiber channel connection ports to effectively stop the servers from sending more data. This is a disruptive last resort to give the backend storage pool time to commit pending data which is accumulating in cache. However, there may be other servers connected to the storage array via the same fiber channel connection ports, and these other servers will also suffer outages because of the backup due to, e.g., a bad or improperly sized job.

BRIEF SUMMARY

Embodiments of the present technology provide a system and computer-implemented method for improving the functioning of storage arrays of electronic memories by allowing for changing a network port speed of a server or other fiber channel initiator communicating data to a storage array, and thereby advantageously reducing the occurrence of or altogether avoiding "cache write pending" conditions and the associated risk of outages of multiple servers.

In a first aspect, a computer-implemented method may be provided for improving the functioning of a data storage array by allowing for dynamically changing a speed of a communications port receiving data from a fiber channel initiator via a fiber channel network, wherein the fiber channel network is managed by a network switch. The computer-implemented method may broadly comprise the following actions performed by a computer. A network switch may be queried to determine for each communications port of a plurality of communications ports which fiber channel initiator of a plurality of fiber channel initiators is sending data to the communications port via the fiber channel network, and a first set of results may be stored in an electronic memory element. The network switch may be queried to determine for each communications port a current speed and a current flow rate of data through the communications port via the fiber channel network, and a second set of results may be stored in the electronic memory element. Based on the second set of results, a particular communications port may be identified which is receiving data at the highest current speed and the highest current flow rate. A maximum allowable speed of data through the particular communications port may be set in the network switch, wherein the maximum allowable speed of data is below the current speed. A description of the change to the maximum allowable speed of data through the particular communications port may be generated and stored in a system log in the electronic memory element.

In a second aspect, a system may be configured to allow for dynamically changing a speed of a communications port receiving data from a fiber channel initiator via a fiber channel network. The system may broadly comprise the following components. A data storage array may be configured to store data, the data storage array having a plurality of communications ports configured to receive the data to be stored. Two or more fiber channel initiators may be configured to send the data to be stored. The fiber channel network may be managed by a network switch and configured to communicate the data from the two or more fiber channel initiators to the data storage array via the plurality of communications ports. An electronic processing element may be configured to execute a computer program which instructs the electronic processing element to perform the following actions. The network switch may be queried to determine for each communications port of the plurality of communications ports which fiber channel initiator is sending data to the communications port via the fiber channel network, and a first set of results may be stored in an electronic memory element. The network switch may be queried to determine for each communications port a current speed and a current flow rate of data through the communications port via the fiber channel network, and a second set of results may be stored in the electronic memory element. A particular communications port may be identified which is receiving data at the highest current speed and the highest current flow rate. A maximum allowable speed of data through the particular communications port may be set in the network switch, wherein the maximum allowable speed of data is below the current speed. A description of the change to the maximum allowable speed of data through the particular communications port may be generated and stored in a system log in the electronic memory element.

Various implementations of any or all of the foregoing aspects may include any one or more of the following additional features. Determining the particular communications port receiving data at the highest current speed and the highest current flow rate may be accomplished by comparing the current speeds and the current flow rates for the plurality of communications ports. The maximum allowable speed of data through the particular communications port may be no more than one-half of the current speed. Setting the maximum allowable speed of data through the particular communications port may be performed only if a cache write pending exceeds a maximum value, which may be 60% or 73%. Setting the maximum allowable speed of data through the particular communications port may be performed only if the data storage array cannot save the data at the current speed at which the data is received at the particular communications port. A message to a recipient informing the recipient of the change to the maximum allowable speed of data through the particular communications port may be generated and sent.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
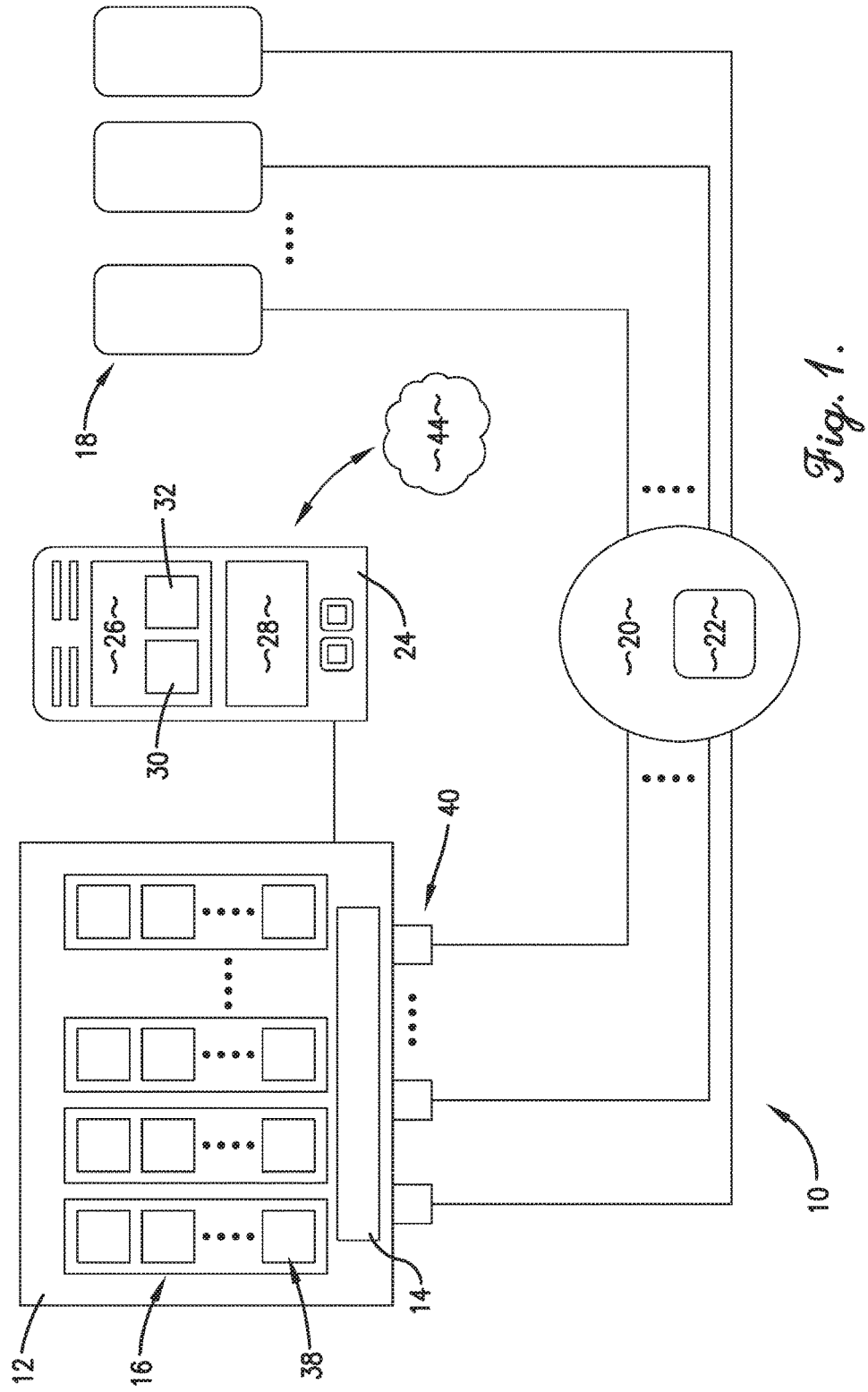
FIG. 1 is a block diagram of an embodiment of a system constructed in accordance with the present technology for dynamically changing a network port speed of a server or other fiber channel initiator.

The Figures depict exemplary embodiments for purposes of illustration only. One skilled in the art will readily recognize from the following discussion that alternative embodiments of the systems and methods illustrated herein may be employed without departing from the principles of the technology described herein.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

The present technology may relate to, inter alia, systems and methods for improving the functioning of storage arrays of electronic memories. Broadly, certain embodiments of the present technology may provide a system and computer-implemented method for improving the functioning of storage arrays of electronic memories by allowing for dynamically changing a network port speed of a server or other fiber channel initiator communicating data to a storage array.

Embodiments may advantageously reduce the occurrence of or altogether avoid "cache write pending" conditions and the associated risk of outages of multiple servers. In more detail, a storage array on a fiber channel network may be configured to identify a potentially problematic server and dynamically reduce the speed of the conversation between the storage array and that server without impacting the speeds of conversations with or other operations of other severs connected to the same storage array.

In one embodiment, the present technology may be implemented as a software module configured for use with an otherwise existing software suite, such as the Hitachi Data Systems® (HDS) Storage Virtualization Operating System (SVOS) version 7.0 or higher, for managing operation of a storage array. For example, a software module may be configured for use with the HDS® SVOS Server Priority Manager for use with an HDS® Enterprise Class G-Series storage array. However, the present technology is not limited to this particular provider, software suite, or storage array, and could, for example, be configured for use with IBM® products or for use with substantially any other software suite and storage array. Thus, although described herein for illustrative purposes as configured for use with HDS® products, the present technology is not limited thereto.

Referring to FIG. 1, an embodiment of an exemplary computer system 10 is shown for improving the functioning of a storage array of electronic memories by allowing for dynamically changing a network port speed of a server or other fiber channel initiator. The system 10 and an exemplary environment in which it may operate may broadly comprise a storage array 12 containing a controller cache 14 and two or more storage pools 16; two or more servers or other fiber channel initiators 18; a fiber channel network 20 managed by a storage area network (SAN) switch 22; a computing device 24 including an electronic memory element 26 and an electronic processing element 28 and configured to store and execute an existing software management product 30 and a software module 32 implementing the present technology for managing the network port speed.

The storage array 12 may be substantially any suitable enterprise class storage array. The controller cache 14 may be an electronic memory of substantially any suitable type and configured to receive and temporarily buffer incoming data received via the fiber channel network 20. The storage pools 16 may be substantially any suitable storage pools for storing data, and each storage pool may include multiple disks 38 or other individual memory elements. The storage array 12 may have multiple communications ports 40 for communicating with the servers 18 via the fiber channel network 20. For example, the storage array 12 may be an HDS® Enterprise Class G-Series Storage array.

The two or more servers or other fiber channel initiators 18 may be substantially any device having data for communication via the fiber channel network 20 to, and storage on the storage array 12. The fiber channel network 20 may be substantially any suitable fiber channel network connecting the storage array 12 to the servers 18 and facilitating data being communicated therebetween, including communication of data from the latter to the former. The SAN switch 22 may be substantially any suitable network switch which may be configured to manage operation of the fiber channel network 20 in an otherwise conventional manner.

The computing device 24 includes the electronic memory element 26 configured to store the existing software management product 30, the software module 32, and/or any data used thereby, and the electronic processing element 28 configured to execute the existing software management product 30 and the software module 32 for managing aspects of the operation of the storage array 12. In more detail, the electronic memory element 26 may facilitate substantially any suitable form of data storage such as volatile, nonvolatile, fixed, and/or removable memory, including read-only memory (ROM), electronic programmable read-only memory (EPROM), random access memory (RAM), erasable electronic programmable read-only memory (EEPROM), and/or other hard drives, flash memory, MicroSD cards, and others. Similarly, the electronic processing element 28 may employ substantially any suitable technology for performing its function. The computing device 24 may be configured to communicate with the storage array 12 and the SAN switch 22 directly or indirectly, wired or wirelessly, and/or if remotely located, via a communications network which may be the same or different from the fiber channel network 20. The existing software management product 30 may be configured to monitor and manage aspects of communication to and from the storage array 12, including managing communication speeds and rates, over the fiber channel network 20. For example, the product 30 may be the HDS® SVOS version 7.0 or higher.

Figure 2:
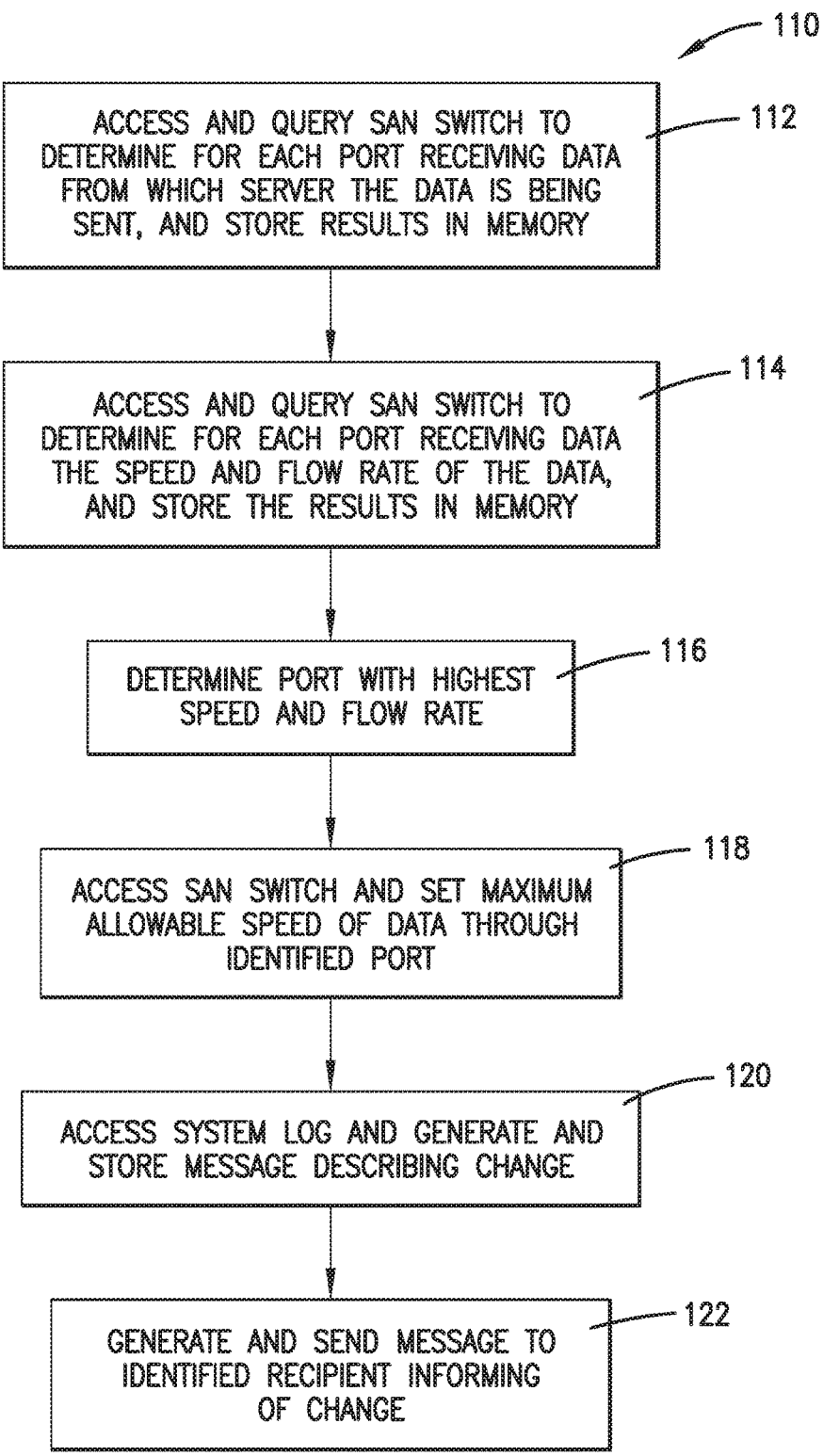
FIG. 2 is a flowchart of an embodiment of a computer-implemented method which may be implemented by the system of FIG. 1.

Referring also to FIG. 2, the system 10 may broadly function as follows. The SVOS product 30 may maintain a list of active servers 18 and their fiber channel World Wide Names (WWNs). During a cache write pending event, the SVOS product 30 may determine the communications ports 40 to which to send OLSs (offline sequences), and which servers 18 are zoned to these communications ports 40.

The present technology may allow for collecting additional information and taking appropriate action to avoid or minimize the effects of an outage which might otherwise result from a cache write pending event. More specifically, the software module 32 may be configured to empower the SVOS product 30 to access (with trusted credentials) the SAN switch 22 to query the current output speeds and rates of the servers 18, in terms of, e.g., bytes/sec, to determine a "top talker" on the fiber channel network 20 that is zoned to the communications ports 40 that would otherwise be taken offline. The software module 32 may then dynamically reduce the current speed of communication (which may be, for example, 16 Gb) from the potentially problematic server, by instructing the SAN switch 24 to set a maximum allowable speed (for example, 4 Gb). This slows the speed at which the potentially problematic server is able to communicate with the storage array 12, thereby allowing the backend storage pool 14 time to catch-up with the amount of data in the controller cache 14, and reducing the number of servers 18 that would otherwise have been negatively impacted by an outage. In one implementation, the maximum allowable speed may be no more than one-half of the current speed. The input conditions that trigger action by the software module 32 may include a situation in which cache write pending is above a maximum value, such as above 60%, or above 73%, and/or when the SVOS product 30 determines that the backend cannot keep up with a given workload.

The software module 30 may be further configured to generate and store in the memory 26 a short syslog entry for reference during any future audit. The nature of this entry might be as simple as "On this date I made this change." The software module 30 may be further configured to generate and send a Simple Network Management Protocol (SNMP)/Simple Mail Transfer Protocol (SMTP)/Command Alert message 44 to one or more identified recipients informing them of the change in port speed.

Thus, rather than potentially impacting multiple servers and/or other initiators during a cache write pending situation, the present technology allows for dynamically changing the network speed at which the potentially problematic server is communicating data to the storage array, thereby reducing the risk of a disruptive outage which might otherwise occur.

The system 10 may include more, fewer, or alternative components and/or perform more, fewer, or alternative actions, including those discussed elsewhere herein, and particularly those discussed in the following section describing the computer-implemented method.

Referring again to FIG. 2, an embodiment of computer-implemented method 110 is shown for improving the functioning of a storage array of electronic memories by allowing for dynamically changing a network port speed of a server or other fiber channel initiator. The computer-implemented method 110 may be a corollary to the functionality of the system 10 of FIG. 1, and may be similarly implemented using the various components of the system 10 within the above-described exemplary operating environment. In particular, each action may be performed or facilitated by the software module 32, or separate sub-modules of the software module 32, or by the SVOS product 30 in cooperation with the software module 32 or individual sub-modules thereof, stored in the memory element 26 and executed by the processing element 28 and generally operating within the context of the system 10 described above.

Broadly, the method 110 may proceed as follows. The SAN switch 22 may be accessed and queried to determine for each communications port 40 receiving data from which server 18 the data is being sent, as shown in 112, and the results may be stored in the memory element 26. The SAN switch 22 may be further accessed and queried to determine for each communications port 40 receiving data from a server 18 a current speed and a current flow rate (in, e.g., Bytes/second) of the data through the communications port 40, as shown in 114, and the results may be stored in the memory element 26.

The communications port 40 with the highest current speed and the highest current flow rate of data may be determined, as shown in 116. For example, this determination may be accomplished by sorting the data obtained from step 112 to identify the "top talker" among the servers 18. The SAN switch may be accessed and a maximum allowable speed of data through the communications port 40 identified in step 116 may be set, as shown in 118, to avoid or reduce the risk of a cache write pending situation in which data is being communicated to the storage array 12 at a speed that is faster than it can be stored. In one implementation, the maximum allowable speed may be no more than one-half of the current speed. In one implementation, this step may be triggered if cache write pending is above a maximum value, such as above 60%, or above 73%, and/or when the SVOS product 30 determines the backend cannot keep up with a given workload.

A system log, such as an Array Sys log, stored in the memory element 26 may be accessed and a message indicating that the port speed was changed may be generated and stored in the Array Sys log, as shown in 120. The nature of this entry might be as simple as "on this date I made this change." A message 44, such as an SNMP/SMTP/Command Alert message, may be sent to one or more identified recipients informing them of the change in port speed, as shown in 122.

The computer-implemented method 110 may include more, fewer, or alternative actions, including those discussed elsewhere herein.

Although the invention has been described with reference to the one or more embodiments illustrated in the figures, it is understood that equivalents may be employed and substitutions made herein without departing from the scope of the invention as recited in the claims.

I claim:

1. A computer-implemented method for improving the functioning of a data storage array by allowing for dynamically changing a speed of a communications port receiving data from a fiber channel initiator via a fiber channel network, wherein the fiber channel network is managed by a network switch, the computer-implemented method comprising the following actions performed by a computer:

querying the network switch to determine for each communications port of a plurality of communications ports which fiber channel initiator of a plurality of fiber channel initiators is sending data to the communications port via the fiber channel network, and storing a first set of results in an electronic memory element;

querying the network switch to determine for each communications port a current speed and a current flow rate of data through the communications port via the fiber channel network, and storing a second set of results in the electronic memory element;

identifying based on the second set of results a particular communications port of the plurality of communications ports which is receiving data at the highest current speed and the highest current flow rate;

setting in the network switch a maximum allowable speed of data through the particular communications port if the data storage array cannot save the data at the current speed at which the data is received at the particular communications port, wherein the maximum allowable speed of data is below the current speed; and generating and storing in a system log in the electronic memory element a description of the change to the maximum allowable speed of data through the particular communications port.

2. The computer-implemented method of claim 1, wherein determining the particular communications port receiving data at the highest current speed and the highest current flow rate is accomplished by comparing the current speeds and the current flow rates for the plurality of communications ports.

3. The computer-implemented method of claim 1, wherein the maximum allowable speed of data through the particular communications port is no more than one-half of the current speed.

4. The computer-implemented of claim 1, wherein setting the maximum allowable speed of data through the particular communications port is only performed if a cache write pending exceeds a maximum value.

5. The computer-implemented method of claim 4, wherein the maximum value is 60%.

6. The computer-implemented method of claim 4, wherein the maximum value is 73%.

7. The computer-implemented method of claim 1, further including generating and sending a message to a recipient informing the recipient of the change to the maximum allowable speed of data through the particular communications port.

8. A computer-implemented method for improving the functioning of a data storage array of electronic memories by allowing for dynamically changing a speed of a communications port receiving data from a server via a fiber channel network, wherein the fiber channel network is managed by a network switch, the computer-implemented method comprising the following actions performed by a computer:

querying the network switch to determine for each communications port of a plurality of communications ports which server of a plurality of servers is sending data to the communications port via the fiber channel network, and storing a first set of results in an electronic memory element;

querying the network switch to determine for each communications port a current speed and a current flow rate of data through the communications port via the fiber channel network, and storing a second set of results in the electronic memory element;

comparing based on the second set of results the current speeds and the current flow rates of the plurality of communications ports to identify a particular communications port which is receiving data at a highest current speed and a highest current flow rate;

determining whether a cache write pending exceeds a maximum value, and if so, setting in the network switch a maximum allowable speed of data through the particular communications port if the data storage array cannot save the data at the current speed at which the data is received at the particular communications port, wherein the maximum allowable speed of data is below the current speed; and generating and storing in a system log in the electronic memory element a description of the change to the maximum allowable speed of data through the particular communications port.

9. The computer-implemented method of claim 8, wherein the maximum value is 60%.

10. The computer-implemented method of claim 8, wherein the maximum value is 73%.

11. The computer-implemented method of claim 8, further including generating and sending a message to a recipient informing the recipient of the change to the maximum allowable speed of data through the particular communications port.

12. A system comprising:

a data storage array configured to store data, the data storage array having a plurality of communications ports configured to receive the data to be stored;

two or more fiber channel initiators configured to send the data to be stored;

a fiber channel network managed by a network switch and configured to communicate the data from the two or more fiber channel initiators to the data storage array via the plurality of communications ports;

an electronic memory element;

an electronic processing element configured to execute a computer program which instructs the electronic processing element to— query the network switch to determine for each communications port of the plurality of communications ports which fiber channel initiator of the plurality of fiber channel initiators is sending data to the communications port via the fiber channel network, and store a first set of results in the electronic memory element;

query the network switch to determine for each communications port a current speed and a current flow rate of data through the communications port via the fiber channel network, and store a second set of results in the electronic memory element;

identify a particular communications port of the plurality of communications ports which is receiving data at the highest current speed and the highest current flow rate;

set in the network switch a maximum allowable speed of data through the particular communications port if the data storage array cannot save the data at the current speed at which the data is received at the particular communications port, wherein the maximum allowable speed of data is below the current speed; and generate and store in a system log in the electronic memory element a description of the change to the maximum allowable speed of data through the particular communications port.

13. The system of claim 12, wherein determining the particular communications port receiving data at the highest current speed and the highest current flow rate is accomplished by comparing based on the second set of results the current speeds and the current flow rates for the plurality of communications ports.

14. The system of claim 12, wherein the maximum allowable speed of data through the particular communications port is no more than one-half of the current speed.

15. The system of claim 12, wherein setting the maximum allowable speed of data through the particular communications port is only performed if a cache write pending exceeds a maximum value.

16. The system of claim 15, wherein the maximum value is 60%.

17. The system of claim 15, wherein the maximum value is 73%.

18. The system of claim 12, wherein setting the maximum allowable speed of data through the particular communications port is only performed if the data storage array cannot save the data at the current speed at which the data is received at the particular communications port.

19. The system of claim 12, further including generating and sending a message to a recipient informing the recipient of the change to the maximum allowable speed of data through the particular communications port.

* * * * *